United States Patent
Jinno et al.

(10) Patent No.: US 7,284,457 B2
(45) Date of Patent: Oct. 23, 2007

(54) SERVO DEVICE FOR RADIO CONTROL

(75) Inventors: Eiji Jinno, Mobara (JP); Yukihiro Dobashi, Mobara (JP)

(73) Assignee: Futaba Corporation, Mobara-shi, Chiba-ken (JP)

( * ) Notice: Subject to any disclaimer, the term of this patent is extended or adjusted under 35 U.S.C. 154(b) by 679 days.

(21) Appl. No.: 10/778,428

(22) Filed: Feb. 16, 2004

(65) Prior Publication Data

US 2004/0160133 A1  Aug. 19, 2004

(30) Foreign Application Priority Data

Feb. 17, 2003  (JP) .............................. 2003-038506

(51) Int. Cl.
*F16H 17/00*  (2006.01)
(52) U.S. Cl. ..................................... 74/1 R; 403/359.1
(58) Field of Classification Search ................ 360/106, 360/104, 105; 403/359.1; 74/1
See application file for complete search history.

(56) References Cited

U.S. PATENT DOCUMENTS

| | | | | |
|---|---|---|---|---|
| 5,808,840 A | * | 9/1998 | Ishimatsu | ................ 360/265.7 |
| 6,579,031 B2 | * | 6/2003 | Bien | ....................... 403/359.1 |
| 2002/0164207 A1 | * | 11/2002 | Bien | ....................... 403/359.1 |

FOREIGN PATENT DOCUMENTS

| | | |
|---|---|---|
| JP | 53-43277 | 7/1975 |
| JP | 2-32319 A | 10/1983 |
| JP | 3049966 | 4/1997 |

* cited by examiner

*Primary Examiner*—David M. Fenstermacher
(74) *Attorney, Agent, or Firm*—Quarles & Brady LLP

(57) ABSTRACT

A servo device for radio control fine-adjusts a linkage rod, which links the servo device and an operation unit, in an accurate positional relationship. The servo device includes a servo motor having a servo output shaft on which a serration is formed, and a servo horn having a shaft bore opened at the lower side thereof, the shaft bore having an inner wall on which an inner serration to be engaged to the servo output shaft is formed. The servo horn has a servo horn base from which the horn output shaft protrudes, the horn output shaft being above and coaxially to the shaft bore, an operation unit having a shaft bore engaging the horn output shaft, and an angular adjustment mechanism for linking the shaft bore of the operation unit to the horn output shaft so as to movably fix circumferentially and at an arbitrary angle.

9 Claims, 11 Drawing Sheets

SERVO DEVICE FOR RADIO CONTROL

CROSS REFERENCE TO RELATED APPLICATION

Not Applicable.

STATEMENT REGARDING FEDERALLY SPONSORED RESEARCH

Not Applicable.

BACKGROUND OF THE INVENTION

1. Field of the Invention

The present invention relates generally to servo devices used for radio control (hereinafter referred to as R/C) devices, which remotely control miniatures, such as model helicopters, model aircrafts, model cars, model ships, and others, and unmanned operated industrial machines. Particularly, the present invention relates to an improvement of a servo horn, capable of fine-adjusting a rod for coupling a servo device and an operation unit in an accurate positional relationship.

2. Description of the Prior Art

Radio steering servo motors for miniatures or servo devices for radio control are well known (refer to Japanese Utility Model Publication No. 53-43277 and Japanese Utility Model Publication No. 2-32319). Basically, as shown in FIGS. 9 and 10, the servomotor includes a servo circuit which comprises a gear chain 3 for reducing the rotation of a motor 2 inside a case 1 and transmitting the reduced rotation to the output shaft 4 to which a rotary shaft of a variable resistor 5 is coupled. The operation amount of the motor 2 is accurately controlled in accordance with the operation amount of a transmitter by comparing signals created corresponding to a resistance value of the variable resistor 5 with the rotation angle of the output shaft 4 representing a received signal.

A serration 4a is formed around the end of the output shaft 4 protruded from the case 1. An inner serration 6a formed in the center installation hole of a servo horn 6 is fit to the serration 4a. Thus, the servo horn 6 is fixed at a predetermined angle to the output shaft 4 so as to prevent idle rotation. Then, the servo horn 6 is fixed to the output shaft 4 by means of a screw 7 so as to prevent pulling out.

In general, the servo horn 6 is formed of an injection molded engineering plastic, such as, Delrin and Juracom. Four arms 6b extending crosswise from the mounting center are disposed as shown in FIGS. 9 and 10. Plural mounting holes 6c are formed at predetermined pitches along the length of each arm. As shown in FIGS. 11(a) to 11(i), there are servo horns of various types and sizes having horizontal opposed arms, a disc-shaped arm, a hexangularly-extended arm, and T-shaped arm. Some servo horns have no mounting holes but have notches marking the lengths and angles of mounting holes. Users can select a suitable servo horn according to the application or necessary lever ratio. After an unnecessary portion of a servo horn is cut off with, for example, a nipper, the servo horn may be attached to the servo output shaft. In the linkage rod, one end may be coupled at a suitable position on the servo horn 6 and the other end may be coupled to the operation unit. Thus, linkage adjustment is performed as to a linkage angle or a lever ratio to an object to be controlled.

The mechanical linkage adjustment method described above is generally performed in such a manner that the transmitter/receiver is powered on and the steering stick of the transmitter is in a neutral position so that the output shaft of the servo device halts its rotation in the neutral position.

The adjustment content includes three factors: adjustment of the length of a linkage rod or wire according to the distance between a servo horn and the operation unit to be manipulated, adjustment of an mounting angle of a servo horn to the output shaft to select an optimum angle to the operation unit, and adjustment of a mounting position of a linkage rod or wire to a servo horn to select a lever ratio according to the movable range of the operation unit. A failure of any type of adjustment causes an erroneous operation.

Particularly, model helicopters require high precision linkage adjustment. In helicopters, a swash plate is disposed around the main mast linked between an engine installed in the body and the rotor head disposed above the body. The swash plate transmits the control force for pitch to the main rotor blade, aileron, and elevator via the link mechanism. The linkage method to each operation unit from the servo device depends on types of machines and manufactures because of differences in link members in use, precision errors, or characteristics of an airframe. Accordingly, it was needed to adjust the angle at which the horn is attached to the output shaft of the servo device, or the linkage position to the rod from the center shaft of the horn according to the airframe.

FIG. 12 shows, for example, a linkage to a 3-point supported swash plate in a model helicopter (refer to Japanese Utility Model Publication No. 304996).

Referring to FIG. 12, in the linkage method where the rod 13 links the horn 11 of the servo motor 10 functioning as an elevator servo to the swash plate, the horn is attached to the servo output shaft in such a way that the operation range of the rod 13 due to the turning of the horn 11, namely, the rocking range of the swash plate 12 is symmetric and that the operation center line of the horn 11 90° to the rod 13. When the swash plate 12 tilts because of an error of the constituent member or the center of the mass of the airframe, the mounting angle of the horn 11 or the mounting position of the rod has to be changed suitably to set the arm shaft of the horn 11 to be 90° with respect to the rod 13. In the servo motor where a linkage to the swash plate 12 is performed as shown in FIG. 12 in which the horn 15 having a horizontally opposed arm to the servo motor 10 functions as an aileron servo, two rods 16 are connected to a T-shaped crank 17 and a rod 18 is linked between the crank 17 and the swash plate 12 based on the reservation of the torque transmission force or on an operational response. In this case, the horn 15 with two arms as shown in FIG. 12 or a disc-shaped horn shown in FIG. 11 (referred to FIG. 11(b), FIG. 11(c) and FIG. 11(h)) is used. Linkage is required such that each rod 16 is set to be 90° with respect to the operational center line of the horn.

Referring to FIG. 12, since the size of the crank 17 is nearly the same as the diameter of the entire length of the horn 15 or the disc-shaped horn, two rods 16 are attached diagonally to the horn (or in the direction of 180° with respect to the center axis). When the size of the crank 17 is larger than the length of the horn 15, the crank 17 is linked to one end of the rod 16. For this reason, in order to set the operational center line with respect to the rod 16 to 90°, it is required to suitably change the installation position of the rod 16 to the horn 15.

In model cars with engines, a sole servo device may often operate different two members, such as, a carburetor throttle and a brake device. In this case, it is required to suitably make a linkage adjustment according to the type of car or a choice by a manipulator or according to the degree that an engine responds to the amount of operation. In other words, the servo device requires to adjust a linkage between the horn and the rod according to the type of machine to be mounted.

However, in the conventional servo devices, the degree of freedom of the angle where the horn is attached to the servo depends on the number of teeth formed as a serration structure that stops the rotation of the output shaft 4 and the horn (FIG. 10). For example, when the number of teeth formed on the horn is 25, the servo device can rotate only at intervals of 14.4°. In order to adjust finer degrees, the serration structure has to have a larger number of teeth. However, since the diameter of the output shaft of the servo device is small, the number of teeth is limited to reserve the torque transmission. Furthermore, with the horn having rod connection holes formed in advance, the distance from the center of the horn is defined according to the bore pitch. In the horns with no holes formed in advance (see FIG. 11(c)), the linkage adjustment is made by forming holes in a horn at arbitrary positions. This fabrication work is burden to the user. Moreover, there is a case that a new hole for readjustment cannot be formed close to the hole once formed, and the new hole has to be formed in a fresh servo horn. Accordingly, the manipulators frequently trying the linkage adjustment, particularly, expert manipulators participating in competitions, cannot achieve not always satisfactory adjustment.

SUMMARY OF THE INVENTION

The present invention is made to solve the above-mentioned problems.

An object of the invention is to provide a servo horn capable of fine-adjusting a linkage rod, which links a servo device and an operation unit in an accurate positional relationship.

In an aspect of the present invention, a servo device for radio control comprises a servo output shaft on which a serration is formed; and a servo horn having a shaft bore opened at the lower side thereof, the shaft bore having an inner wall on which an inner serration to be engaged to the servo output shaft is formed. The servo horn includes a servo horn base from which a horn output shaft protrudes, the horn output shaft being above and coaxially to the shaft bore; an operation unit having a shaft bore to which the horn output shaft is engaged, and an angular adjustment mechanism for linking the shaft bore of the operation unit to the horn output shaft so as to movably fix circumferentially and at an arbitrary angle.

According to the present invention, the servo horn can be mounted at an arbitrary mounting angle with respect to the servo output shaft, without being limited by the serration mechanism of the servo output shaft. The angular adjustment mechanism comprises a serration structure formed on the periphery of the horn output shaft and in the inner wall of the shaft bore so that the mounting angle can be adjusted more finely with the serration pitch reduced.

The operation unit is provided with an arm for linking a linkage rod to transmit a control force to the linkage rode side via the arm. A plurality of arms are disposed around the shaft bore so that plural linkage rods can be linked. The arm has a through hole, for linking a linkage rod, formed in line connecting the outer end of the arm and the center of the operation unit so that the lever ratio can be changed. The through hole comprises a long hole formed along the line connecting the outer end of the arm and the center of the operation unit to adjust the lever ratio steplessly. The servo horn is provided with an arm acting as an operation unit disposed around the base thereof so that the angle to the arm of the operation unit side can be adjusted.

The arm of the servo horn base has a through hole linking the linkage rod formed along the line connecting the outer end of the arm and the center of the base. The through hole comprises a long hole formed along the line connecting the outer end of the arm and the center of the operation unit.

BRIEF DESCRIPTION OF THE DRAWINGS

This and other objects, features, and advantages of the present invention will become more apparent upon a reading of the following detailed description and drawings, in which.

DETAILED DESCRIPTION OF THE PREFERRED EMBODIMENTS

Figure 1A:
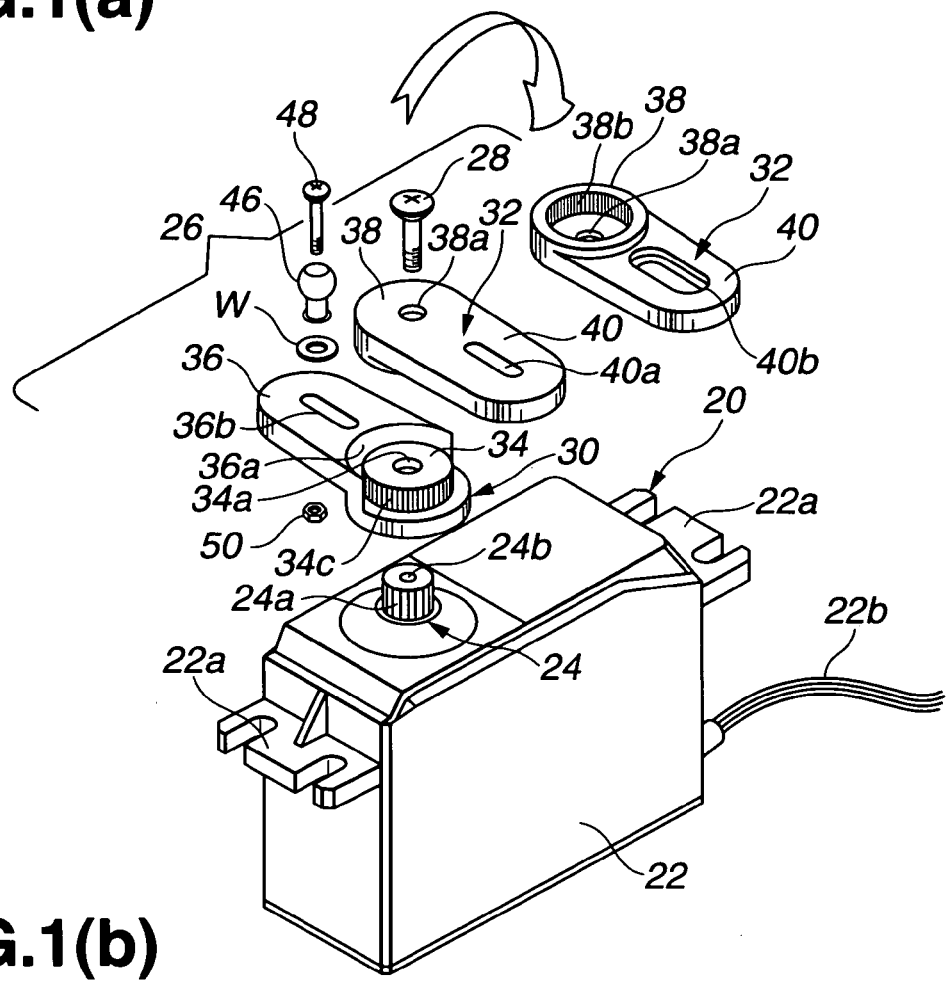
FIG. 1(a) is an exploded view illustrating a servo device according to a first embodiment of the present invention and FIG. 1(b) is an assembly view illustrating the same.
Figure 1B:
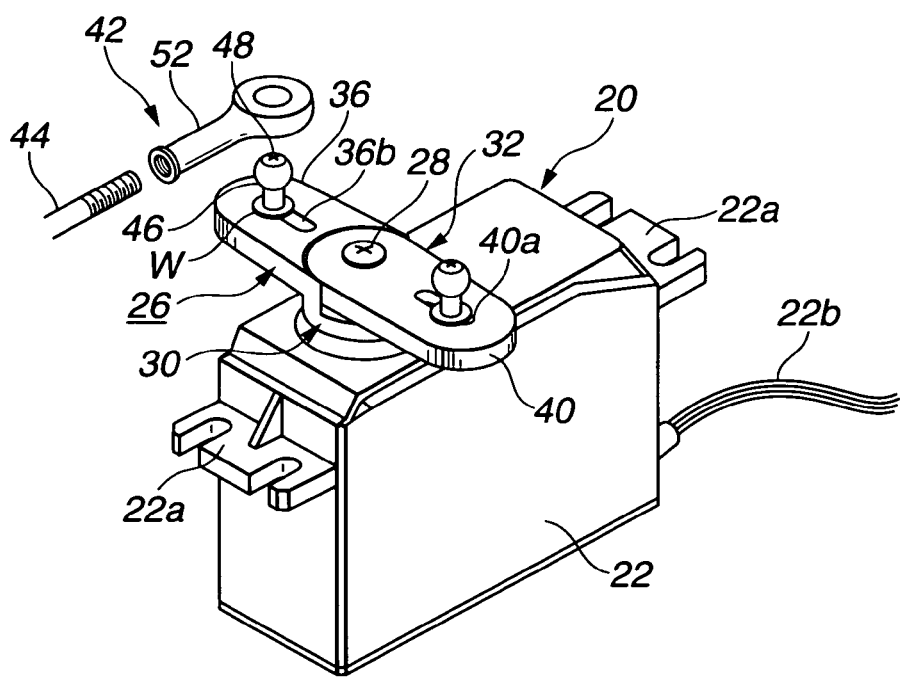
Figure 2A:
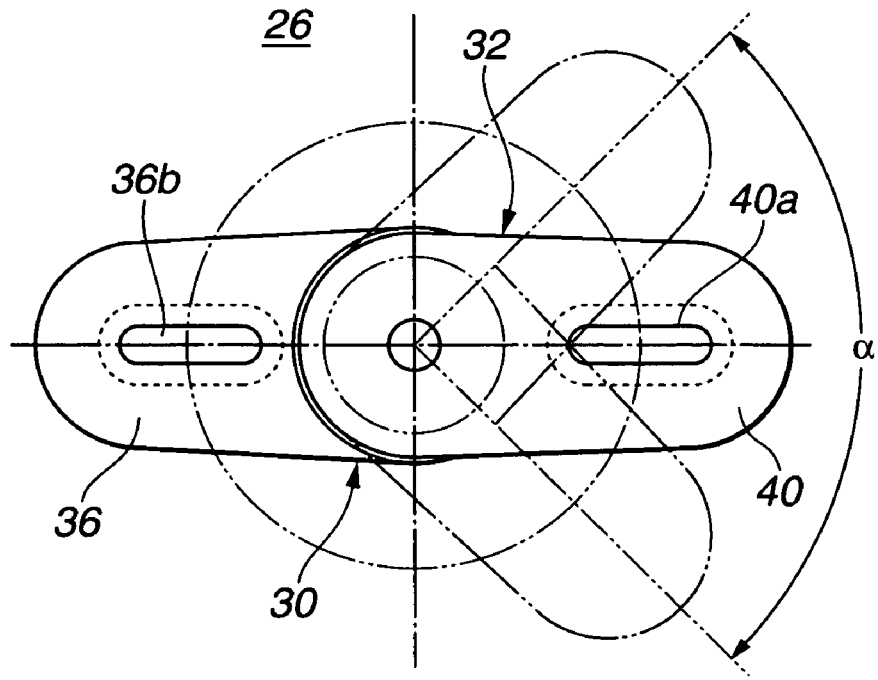
FIG. 2(a) is a plan view illustrating a servo horn and FIG. 2(b) is a cross-sectional view illustrating the same.
Figure 2B:
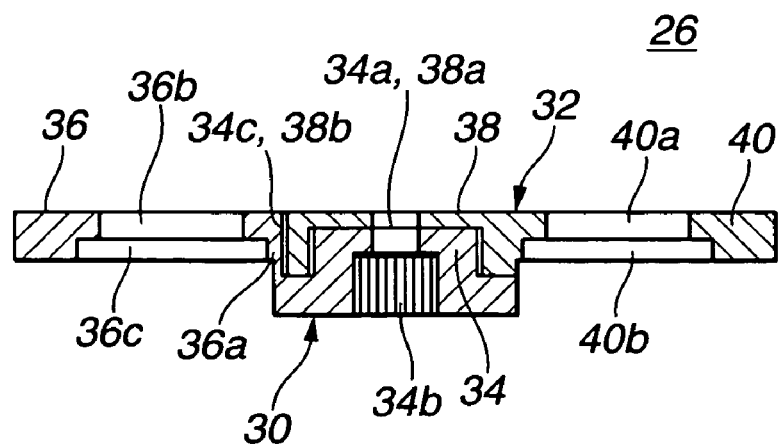

Preferred embodiments of the present invention will be described below by referring to the attached drawings. FIGS. 1 and 2 show a first embodiment of the present invention. FIGS. 1(a) and 1(b) show the entire structure of a servo device according to the present invention. FIGS. 2(a) and 2(b) show a sole servo horn.

Figure 10:
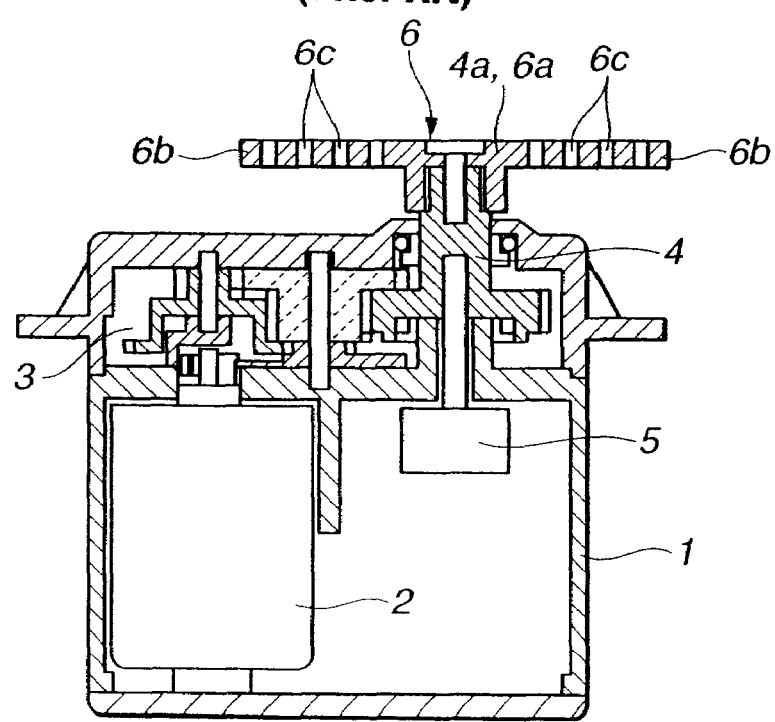
FIG. 10 is a cross-sectional view illustrating the internal mechanism of a servo motor in the conventional servo device.
Figure 11A:
FIGS. 11(a) to 11(i) are plan views and cross-sectional views, illustrating conventional servo horns of various types used for the conventional servo device.
Figure 11B:
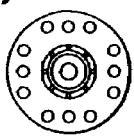
Figure 11B:
Figure 11C:
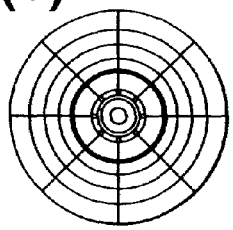
Figure 11C:
Figure 11D:
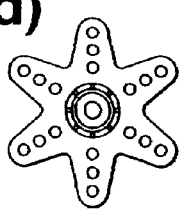
Figure 11D:
Figure 11E:
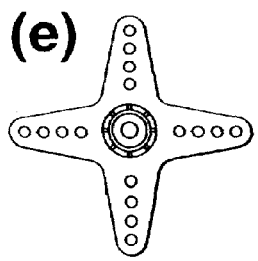
Figure 11E:
Figure 11F:
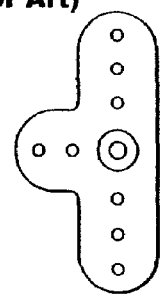
Figure 11F:
Figure 11G:
Figure 11H:
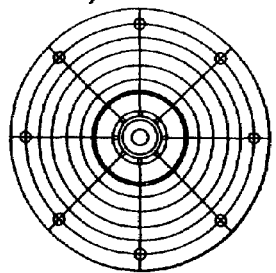
Figure 11H:
Figure 11I:
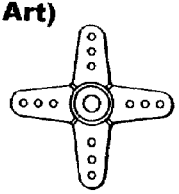
Figure 11I:
Figure 12:
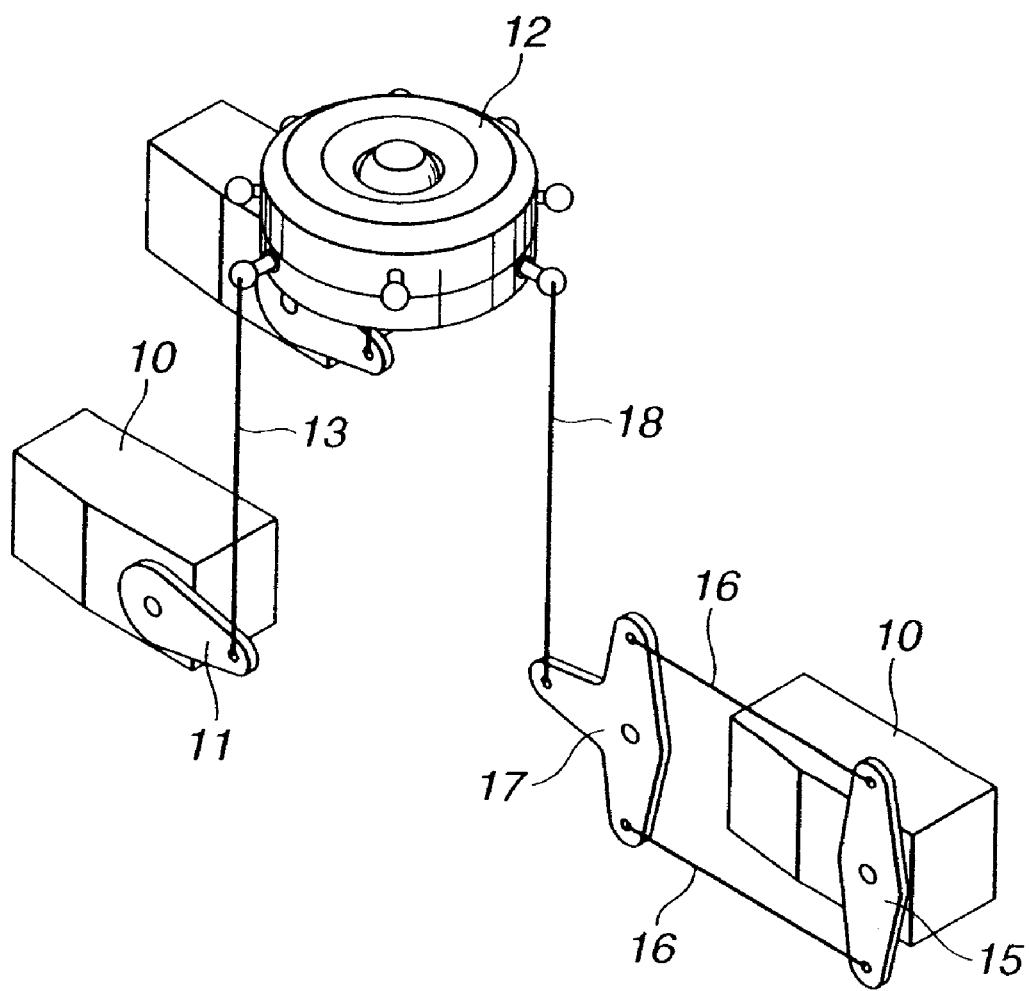
FIG. 12 is an explanatory view showing an example of a linkage to a three-point supported swash plate in a model helicopter.

Referring to FIGS. 1 and 2, the servo device comprises a servo motor 20 acting as a device body, a servo output shaft 24 protruding upward from the case 22 for the servo motor 20, and a two-arm-type servo horn 26 linked to the servo output shaft 24. The internal mechanism of the servo motor 20 is identical to that shown in FIG. 10 and hence the duplicate explanation will be omitted here.

Mount sections 22a are formed before and behind the case 22 to fix the servo device at an installation position with a wood screw or a metal screw. Lead wires 22b are derived from the rear of the case to connect it to the receiver.

A serration 24a is formed on the outer surface of the end of the servo output shaft 24 protruded from the case 22. The serration 24a has teeth of 25, which are arranged at pitch intervals of 14.4° as described hereinabove. A threaded hole 24b, in which the set screw 28 for the servo horn 26 is screwed, is formed in the center of the servo output shaft 24.

The servo horn 26 is formed of a diecast aluminum or an injection mold of an engineering plastic, such as Delrin or Juracom. The servo horn 26 has a two-divisional structure including a servo horn base, or a attachment mount 30, detachably fit to the servo output shaft 24, and an operation unit 32 detachably fit onto the mount 30.

The mount 30 is a disc having a predetermined thickness. A boss 34 acting as a horn output shaft, in which the operation unit 32 is detachably fit, protrudes upward from the center of the mount 30. The boss 34 has a through hole 34a in which the set screw 28 vertically passes through the center thereof. A shaft bore or hole that engages with the servo output shaft 34a is formed under the through hole 34a and inside the boss 34 so as to have a lower open end. The shaft hole is coaxial to the boss 34. An inner serration 34b, which engages with the serration 24a of the servo output shaft 24, is formed on the inner wall surface of the shaft hole (see FIG. 2(b)).

The inner serration 34b has the same number of teeth and pitches as those of the servo output shaft 24. The mount 30 is fitted to the servo output shaft 24 in such a way that the angle can be adjusted at pitch intervals of 14.4°.

A serration 34c for adjusting the angle to the operation unit 32 is formed on the periphery of the boss 34. The serration 34c as teeth of 72, which are arranged at pitch intervals of 5°. In addition, an operation arm 36 extends integrally from the one side of the mount 30 via the rising wall 36a. In the arm 36, a long hole 36b is formed along the line connecting the through hole 34a and the end of the arm 36. A nut receiving groove 36c having a width larger than the long hole 36b is carved on the lower side of the long hole 36b (refer to FIG. 2(b)).

The operation unit 32 is formed of a disc-like boss receiving block 38 disposed on the mount 30 and being slightly thick, and an operation arm 40 integrally extending from the side of the boss receiving block 38. A through hole 38a is formed in the center of the boss receiving block 38 in such a way that the set screw 28 vertically passes through the center thereof. A shaft hole, in which the boss 34 is engaged, is formed on the lower side of the boss receiving block 38 so as to be coaxial with the boss 34 and be open at the lower surface of the shaft hole. The inner serration 38b, which has the same number of teeth and pitches as those of the boss 34, is carved on the inner surface of the shaft hole. The operation unit 32 is inserted into the mount 30 so as to adjust the angle at intervals of 5°. As a result, fine angular adjustment can be performed at about ⅓ pitch of the conventional angular adjustment.

The operation arm 40 has the same length as the operation arm 36 on the side of the mount 30 so as to be coplanar. The operation arm 40 has the same long hole 40a as the operation arm 36 and the wider nut receiving groove 40b formed under the long hole 40a. Therefore, the arm 36 on the side of the mount 30 and the arm 40 on the side of the operation unit 32 are linked together such that the crossed axes angle can be fine adjusted between a horizontally opposed state and the predetermined angle α as shown in FIG. 2(a) at intervals of 5°. The arm 36, 40 is linked to one end of the linkage rod 44 via the ball link 42.

The ball link 42 is formed of a ball 46 attached to the long hole 36b, 40a via a washer W, a mounting screw 48 through which the ball 48 vertically passes, a nut 50 connected to the attachment screw 48 through the rear side, and a ball support 52 linked so as to rock around the ball 46 and having one end with a receiving hole in which the linkage rod 44 is securely screwed. The nut 50 fits to the receiving groove 36c, 40b to prevent free rotation upon driving and dropping due to the free-rotation. The ball 46 can be steplessly adjusted in the longitudinal direction of each arm 36, 40 by loosing the attachment screw 48. The attachment screw 48 is fastened at the position where the lever ratio has been set. Thus, the ball 46 is fixed at the position.

Figure 3A:
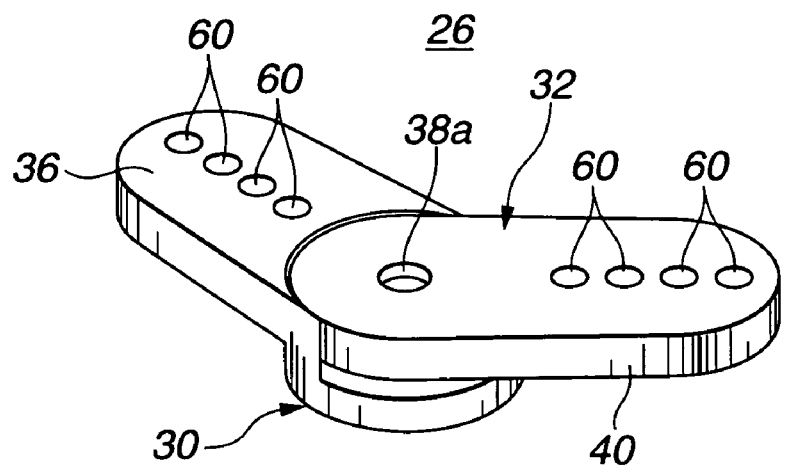
FIG. 3(a) is a perspective view illustrating a modified servo horn and FIG. 3(b) is a perspective view illustrating the same.
Figure 3B:
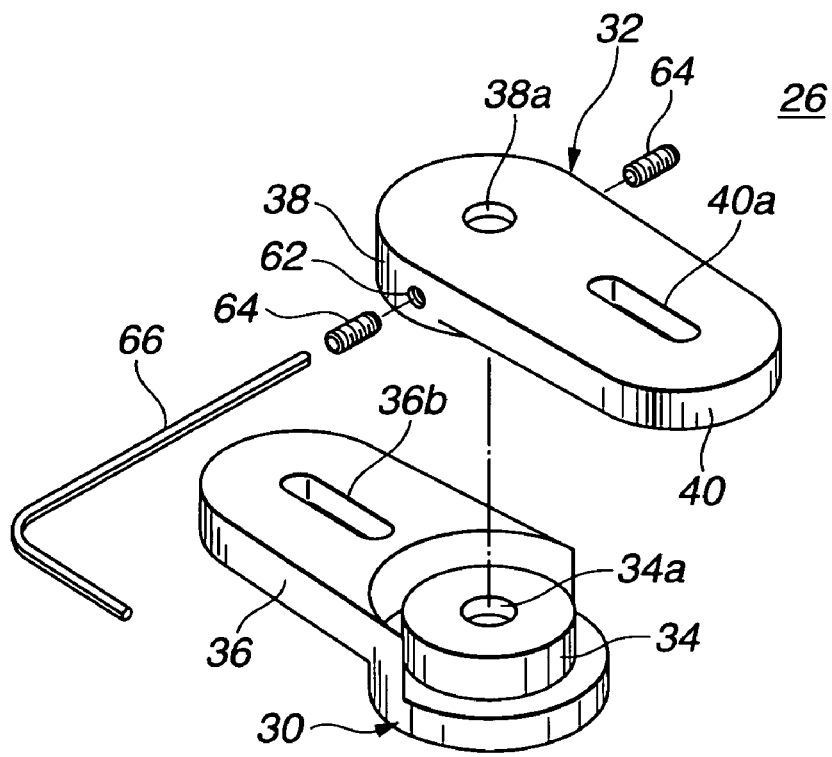

FIGS. 3(a) and 3(b) show a modification of the servo horn 26. Like numerals are used to show the same elements as those described above. In the modification shown in FIGS. 3(a) and 3(b), different elements only will be explained using different reference numerals.

First, the structure is similar to that in the first embodiment. However, the arm 36 belonging to the mount 30 has plural through holes 60 for rod attachment formed at predetermined pitch intervals and the arm 40 of the operation unit 32 has plural through holes 60 for rod attachment formed at predetermined pitch intervals. The rotational angle of the operation unit 32 to the mount 30 can be adjusted at intervals of 5°. This modification is suitable for the case where the lever ratio does not require fine adjustment.

Referring to FIG. 3(b), the boss 34 protruding from the mount 30 is formed of a cylinder type. The shaft bore of the corresponding boss receiving block 38 has a cylindrical inner wall surface. The shaft is merely fit into the shaft hole. However, in place of the structure, a pair of screw bores 62, reaching the inside of the shaft bore, are formed in the side surface of the boss receiving block 38. A rotation prevention screw 64 is screwed into each screw bore 62. In order to adjust the angle of the arm 36 and 40, an optimum angle is found with the screw 64 loosen. Then, the screw 64 is fastened at the position with an Allen wrench. In this modification, finer adjustment can be performed at angular intervals of 5° or less.

Next, an embodiment where the above servo device is applied to the aileron linkage adjustment of a helicopter will be explained below by referring to FIG. 4.

Figure 4:
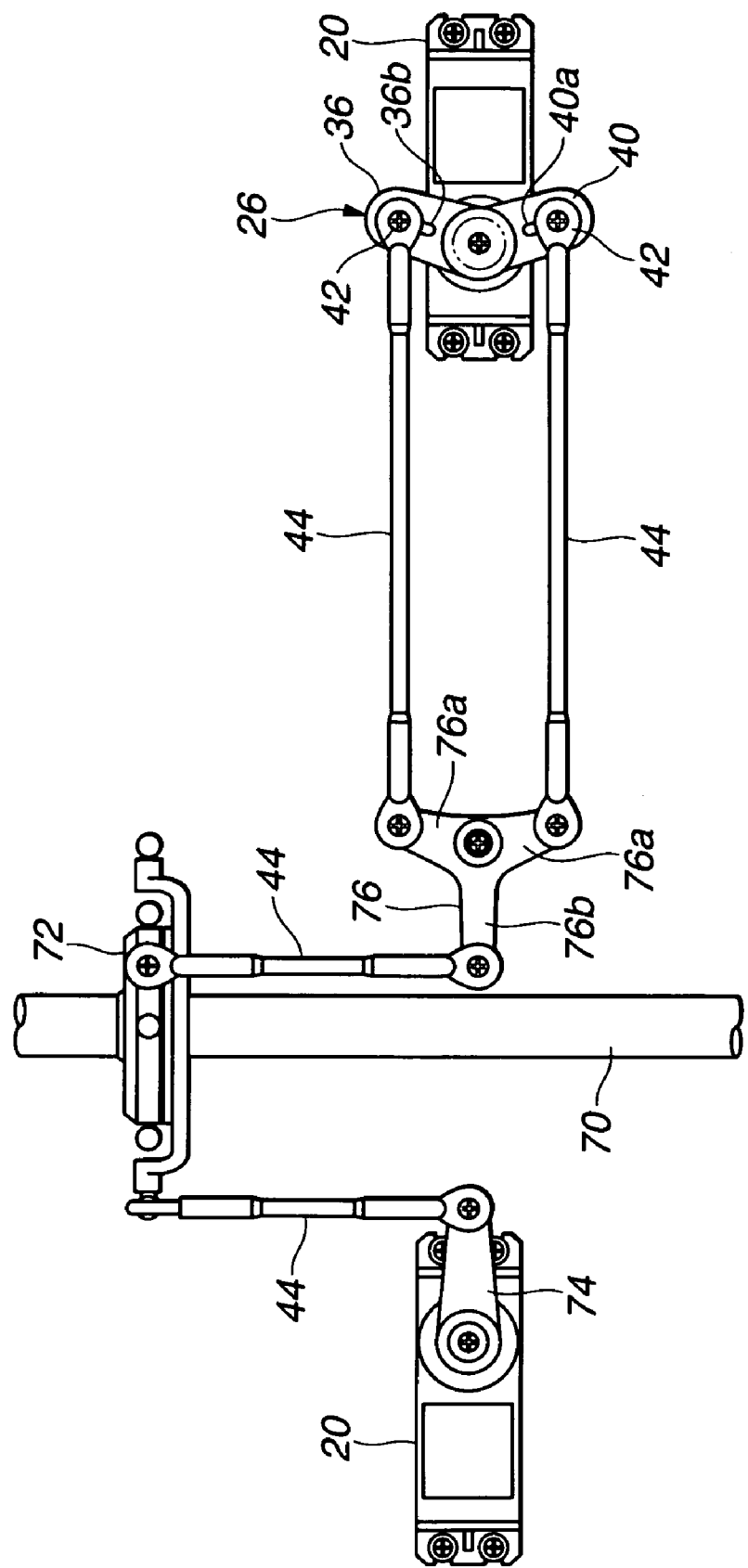
FIG. 4 is an explanatory view showing a servo device according to the present invention, applied to a swash plate for a helicopter.

In FIG. 4, a swash plate 72 is disposed around the main rotor mast 70, of which the upper portion is linked to a main rotor head (not shown) and the lower portion is linked to an engine (not shown). The swash plate 72 is linked to the main rotor head via a link mechanism such as a wash-out (not shown) over the upper portion of the swash plate 72. On the left side of FIG. 4, the servo motor 20 acting as an elevator servo is disposed and linked to the swash plate 72 via one-arm type horn 74 and the linkage rod 44. In contrast, on the right side of FIG. 4, the servo motor 20, functioning as an aileron servo, is disposed.

In the embodiment shown in FIG. 4, the servo horn 26 is attached to the servo motor 20. The arms 36 and 40 of the servo horn 26 are linked to a pair of crank arms 76a, formed at one side of the T-shaped crank 76 disposed beneath the swash plate 72, via a pair of parallel linkage rods 44, respectively. The arms 36 and 40 are linked via a single linkage rod 44 between the swash plate 72 and one crank arm 76b disposed on the other side of rocking fulcrum of the crank 76. The back-and-forth motion by the two linkage rods 44 is used as a linking method performed in terms of reservation of a torque transmission force or on a motion response as described above.

In the T-shaped crank 76, the crank arms 76a are not opposed 180°, but are angled slightly backwards. The open angle of each arm 36 and 40 is adjusted corresponding to the tilt degree so that it can be matched with the open angle between the crank arms 76a. In addition, since each ball link 42 linked to the end of the linkage rod 44 moves in the direction of the long hole, the parallelism of the linkage rods 44 can be adjusted with good precision. This allows the control force of the servo motor 20 to be transmitted accurately to the swash plate 72 at a lever ratio of 1:1. Even when the crank is larger than the servo horn, the control force can be transmitted.

Figure 5:
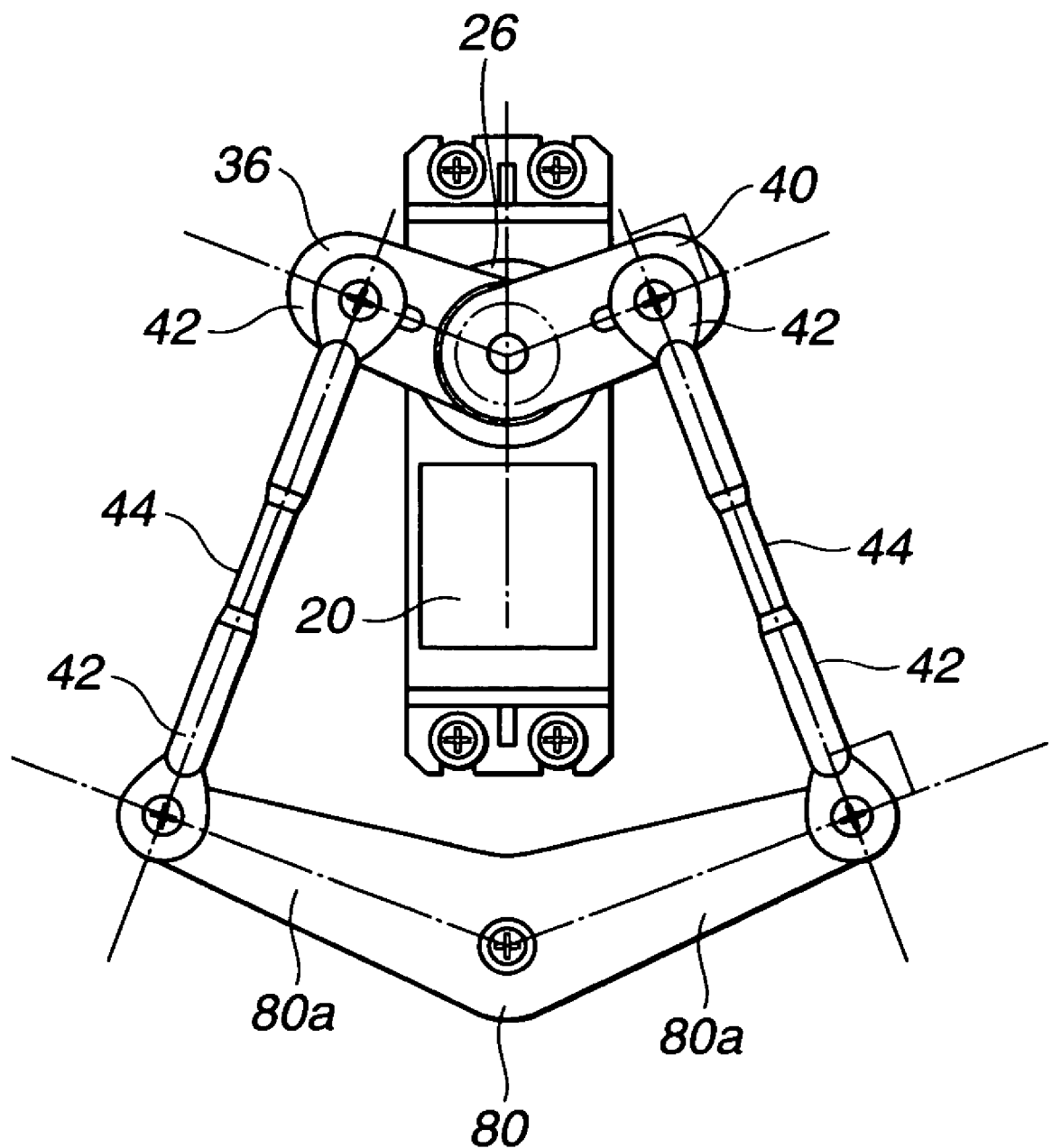
FIG. 5 is a plan view illustrating a servo device applied for a linkage to a crank of a different lever length.

FIG. 5 shows an embodiment where the crank is larger than the servo horn. The open angle of each arm 36 and 40 of the servo horn 26 is adjusted corresponding to the open angle of the large crank 80 having a pair of crank arms 80a angled symmetrically. Meanwhile, the length of the linkage rod 44 is adjusted. Thus, the axial line of the linkage rod 44 can be set to be perpendicular to the axial line of each arm 36 and 40 of the servo horn 26, and the control force can be accurately transmitted, even when the crank differs from the servo horn in size.

Next, an embodiment where the servo device of the present invention is applied to the control of a radio-controlled car such as an engine buggy will be explained below by referring to FIG. 6.

Figure 6:
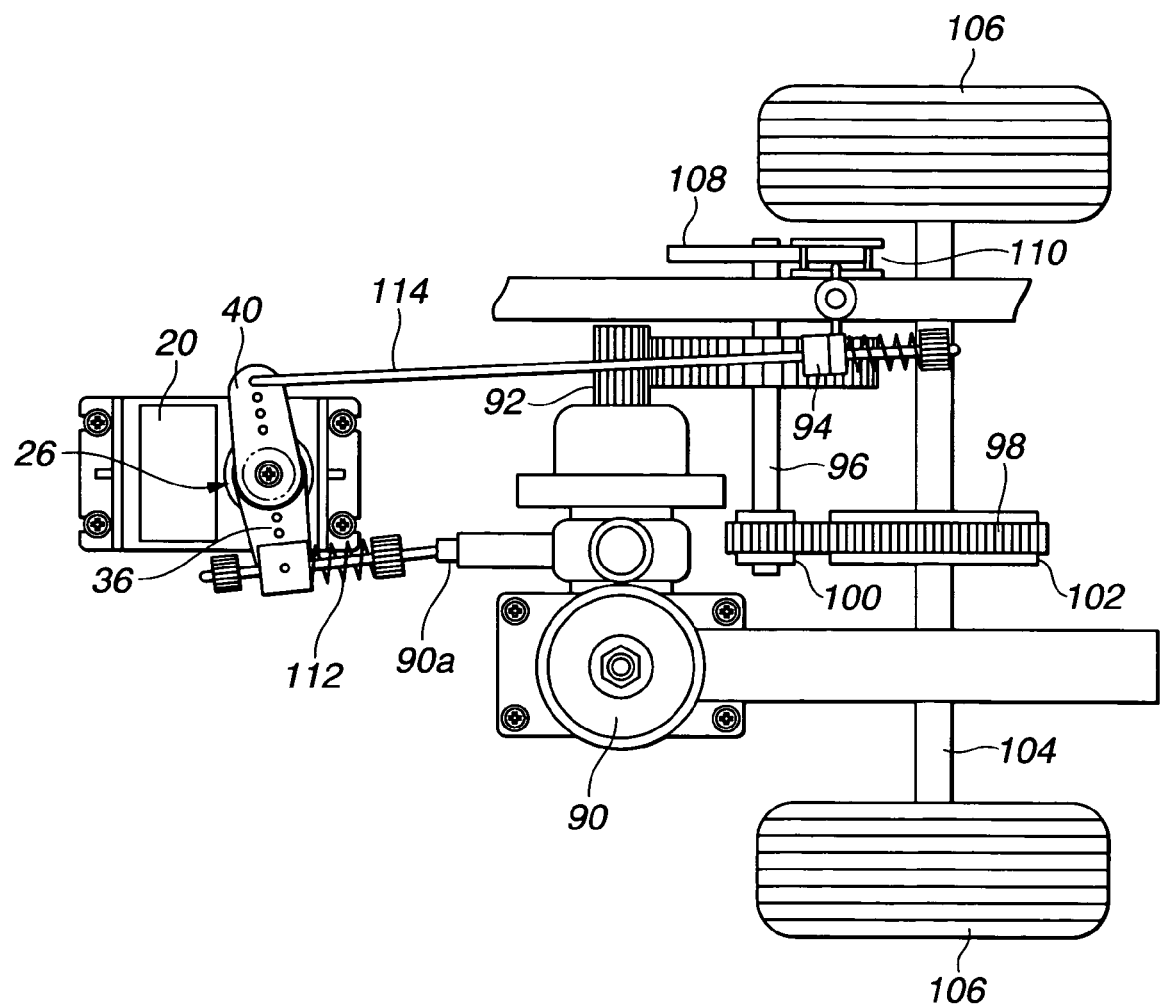
FIG. 6 is a plan view illustrating a servo device applied for linkage adjustment of the throttle and brake control of a radio-controlled car.

As shown in FIG. 6, the output shaft of a two-cycle glow engine 90 is connected to the intermediate shaft 96 via the centrifugal clutch, the pinion 92 and the large size gear 94. The intermediate shaft 96 is connected to the rear wheel shaft 104 via the timing pulley 98 and the large timing belt 100 and the small timing pulley 102. This mechanism transmits the rotation of the engine 90 to the rear wheel 106 connected to the rear wheel shaft 104.

In addition, a disc plate 108 for braking is linked to the shaft end of the intermediate shaft 96. The brake device 110, which is provided with a pair of brake pads confronting the disc plate 108 and a return spring, and others, applies the brake. One servo device interchangeably operates the brake device 110 and the carburetor throttle valve 90a of the engine 90. That is, in the interlocking operation, when the engine 90 rotates in a high speed with the throttle open, the brake device becomes open. When the engine 90 rotates in a low speed with the throttle closed, the brake device releases the brake. For this operation, one arm 36 of the servo horn 26 attached to the servo motor 20 links to the linkage rod 112, which opens and closes the throttle lever of the engine 90. The other end of the arm 40 links to the linkage rod 114 for opening and closing the brake device 110.

When one servo device performs the above alternative control, the relationships between the timing adjustment, the brake pull amount and the throttle travel become complicated. However, since the angle of each arm 36, 40 can be adjusted fine and quickly, a finer adjustment can be made according to the user's taste.

Figure 7A:
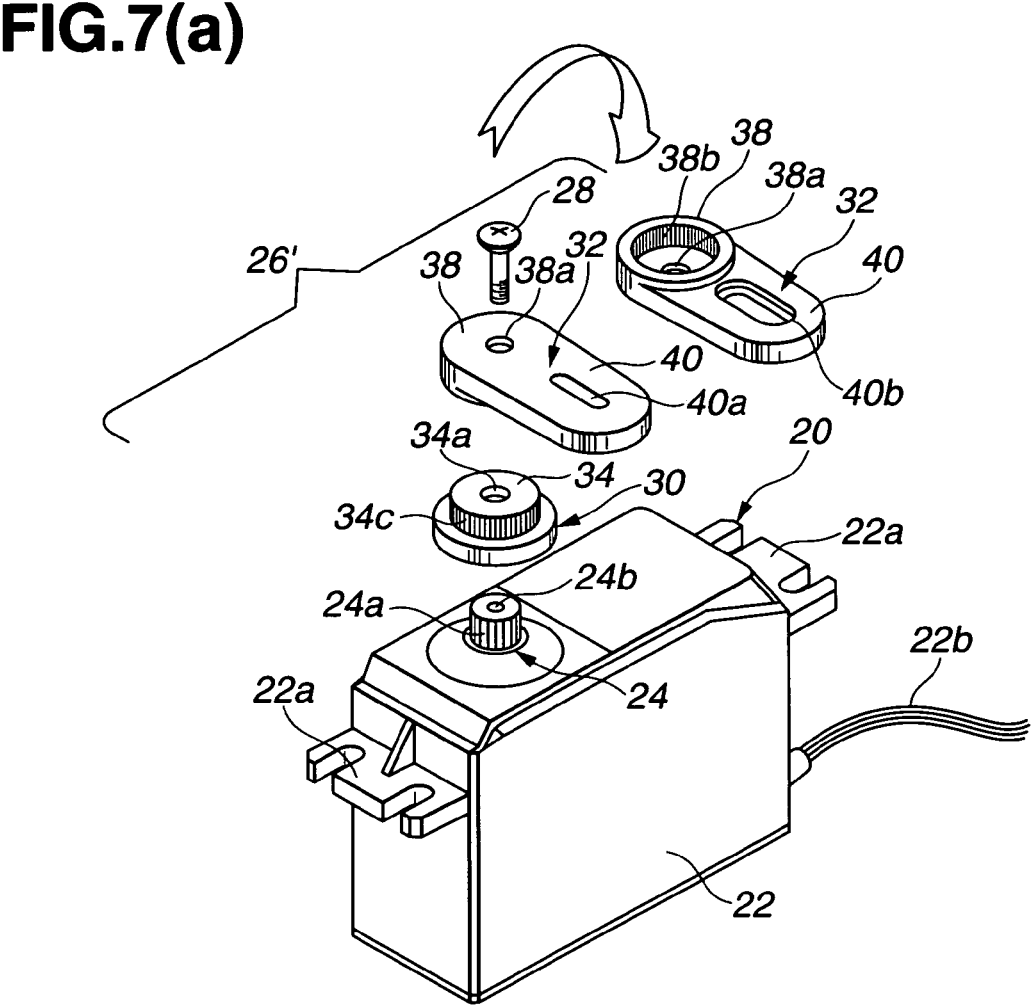
FIG. 7(a) is an exploded view illustrating a servo device according to a second embodiment of the present invention and FIG. 7(b) is an assembly view illustrating the same.
Figure 7B:
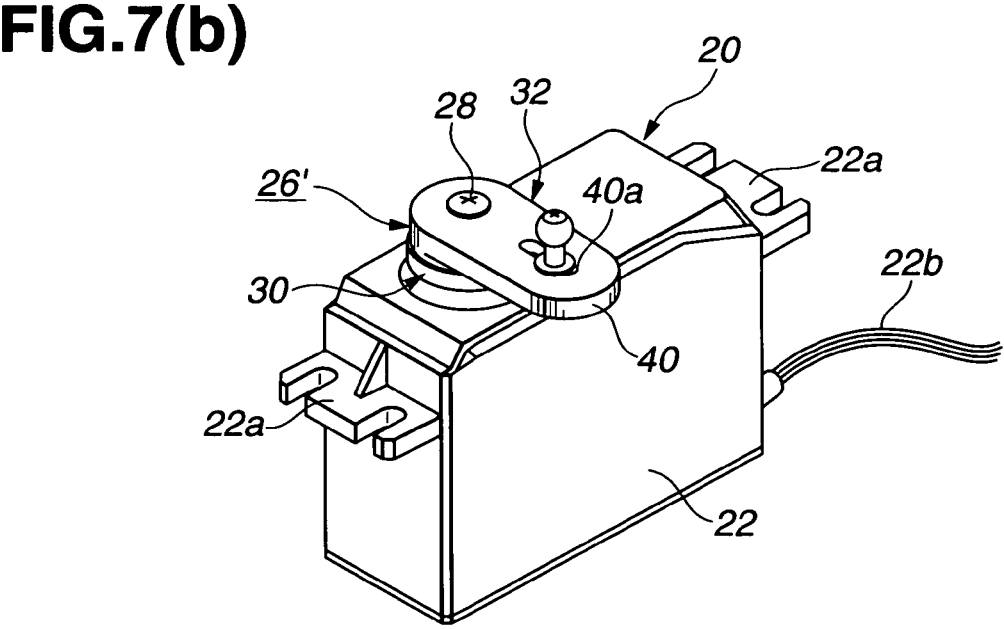

FIG. 7 shows a second embodiment according to the present invention. In an explanation of this embodiment, like numerals are attached to the same elements as those in the first embodiment.

The servo horn 26' of FIG. 7 in the second embodiment differs from that of the first embodiment in that the mount 30 is shaped in a simple disc and the boss 34 protrudes upward from the mount 30. Other elements are similar to those in the first embodiment.

In the assembly of the servo horn 26', the single arm 40 is disposed around the servo output shaft 24. An engagement between the serration 34c and the serration 38c allows the arm 40 to be adjusted over 360° every 5 degrees. In this embodiment, in place of the long hole 40a formed in the arm 40 of the operation unit 32, attachment bores may be provided as shown in the modification shown in FIG. 3(a) of the first embodiment. Fixing may be made with screws, in place of the serration linkage in the modification shown in FIG. 3(b). Furthermore, as to the arm 40 in this embodiment, plural or disc arms may be used according to purposes and applications, as shown with the conventional example of FIGS. 11(a) to 11(i).

Next, an embodiment where the servo device using one arm-type servo horn 26' is applied to a four-wheel-drive radio-controlled car will be explained below by referring to FIG. 8.

Figure 8:
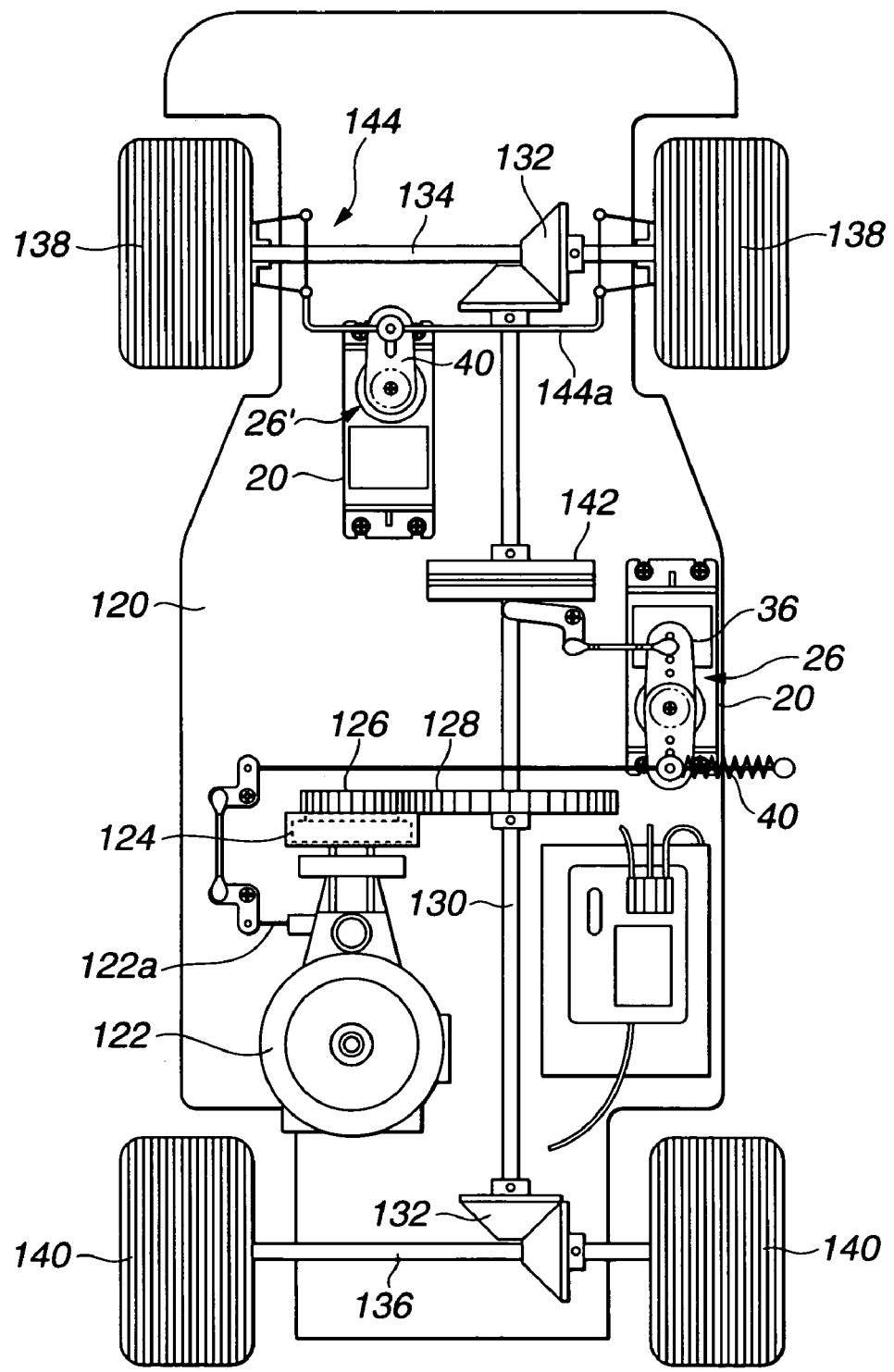
FIG. 8 is a plan view illustrating a servo device applied to linkage adjustment in the steering system of an engine car.
Figure 9:
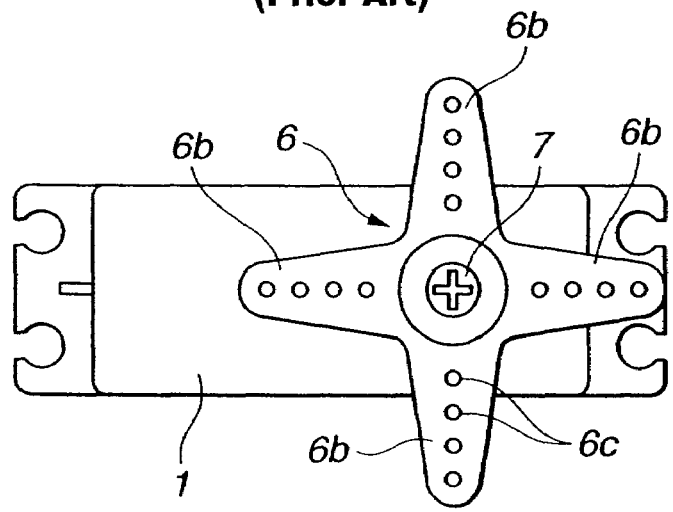
FIG. 9 is a plan view illustrating a conventional servo device.

In FIG. 8, the output shaft of the glow engine 122 installed toward the car frame on the chassis 120 is connected to the intermediate shaft 130 via the centrifugal clutch 124, the pinion 126 and the gear 128. The front end and the rear end of the intermediate shaft 130 are connected to the front wheel shaft 134 and the rear wheel shaft 136 transformed 90 degrees via the bevel gear 132, respectively. Thus, the intermediate shaft 130 transmits its rotational force to the front wheel 138 and the rear wheel 140. The disc brake device 142 is disposed at a suitable position of the intermediate shaft 130. The brake device 142 and the throttle 122a of the engine 122 are driven alternately and controllably by the servo device with the two-arm servo horn 26 described with the first embodiment with reference to FIG. 6.

The drive force is transmitted to the front wheel 138 and the steering link mechanism 144 enables the steering operation. The servo device, to which the one-arm-type servo horn 26' is provided, is linked to the linkage rod 144a of the link mechanism 144. In this case, with the linkage at a steering angle of 0°, or in a neutral position, the arm 40 is perpendicular to the linkage rod 144a. However, the serration structure can fine adjust the steering angle so as to be equally on both sides.

The servo horn having one-arm 26' can be preferably utilized as the linkage for controlling the elevator of a helicopter as shown in FIG. 4. That is, in the linkage with the swash plate 72 via the linkage rod, the servo horn of the servo motor 20 operating as an elevator servo has to be fine adjusted in linkage according to the tilt of the swash plate set in terms of the mass center of an airframe or the steering characteristics, or in terms of the set position of the servo motor 20, or the like. However, a fine adjustment becomes possible by using the servo horn having one-arm 26'.

In the above-mentioned embodiments, the serration structure has been shown as an example of an angular adjustment mechanism for adjusting the angle between the servo horn base and the operation unit. Here, the term "serration" does not mean "serration" only defined as a mechanical term. The term "serration" further includes general detachable linkage structures that can transmit rotation, such as spline structures or a pair of bevel gears interlocked. In brief, both the shaft and the boss receiving the shaft can move mutually and along the shaft. Both the elements can be adjusted regarding their relative positions in the rotational direction. However, when the shaft is once fit to the boss, they are fixed with a respectable fixing force in the rotational direction. As a result, the resultant structure can be rotated as one component.

As apparent from the above explanation, the servo motor for radio control of the present invention can fine adjust the linkage rod linking the servo device and the operation unit in an accurate position relationship.

Obviously, many modification and variations of the present invention are possible in the light of the above teachings. It is therefore to be understood that within the scope of the appended claims, the invention may be practiced otherwise than as specifically described.

What is claimed is:

1. A servo device for radio control comprising:
    a servo motor having a servo output shaft on which a serration is formed; and
    a servo horn having a shaft bore opened at the lower side thereof, said shaft bore having an inner wall on which an inner serration to be engaged to said servo output shaft is formed; wherein said servo horn includes a servo horn base from which a horn output shaft protrudes, said horn output shaft being above and coaxially to said shaft bore;
    an operation unit having a shaft bore to which said horn output shaft is engaged; and
    an angular adjustment mechanism linking the shaft bore of said operation unit to said horn output shaft selectively fixes said horn output shaft relative to said shaft bore circumferentially and at an arbitrary angle.

2. The servo device as define claim 1, wherein said angular adjustment mechanism comprises a serration structure formed on the periphery of said horn output shaft and in the inner wall of said shaft bore.

3. The servo device as defined in claim 1, further comprising an arm attached to said operation unit.

4. The servo device as defined in claim 3, wherein as said arm, a plurality of arms are disposed around said shaft bore or a disc shaped arm is disposed around said shaft bore.

5. The servo device as defined in claim 3, wherein each of said arms has a through hole formed in line connecting the outer end of said arm and the center of said operation unit.

6. The servo device as defined in claim 5, wherein said through hole comprises a long hole formed along the line connecting the outer end of said arm and the center of said operation unit.

7. The servo mechanism defined in claim 1, further comprising an arm acting as an operation unit disposed around said servo horn base.

8. The servo device as defined in claim 7, wherein said arm has a through formed along the line connecting the outer end of said arm and the center of said base.

9. The servo device as defined in claim 8, wherein said through hole comprises a long hole formed along the line connecting the outer end of said arm and the center of said operation unit.

* * * * *

UNITED STATES PATENT AND TRADEMARK OFFICE
CERTIFICATE OF CORRECTION

PATENT NO. : 7,284,457 B2  Page 1 of 1
APPLICATION NO. : 10/778428
DATED : October 23, 2007
INVENTOR(S) : Jinno et al.

It is certified that error appears in the above-identified patent and that said Letters Patent is hereby corrected as shown below:

Column 1, Line 41 "protruded" should be changed to -- protruding --

Column 2, Line 7 "of an mounting" should be changed to -- of a mounting --

Column 2, Line 21 "manufactures" should be changed to -- manufacturers --

Column 2, Line 65 "different two" should be changed to -- two different --

Column 3, Line 27 "cannot achieve not always" should be changed to -- cannot always achieve --

Column 5, Line 33 "34c as teeth" should be changed to -- 34c has teeth --

Column 6, Line 38 "screw 64 loosen." should be -- screw 64 loose. --

Signed and Sealed this

Sixth Day of May, 2008

JON W. DUDAS
*Director of the United States Patent and Trademark Office*